Feb. 3, 1959     T. A. DAMONE     2,871,642
EYE PROTECTOR
Filed July 1, 1955
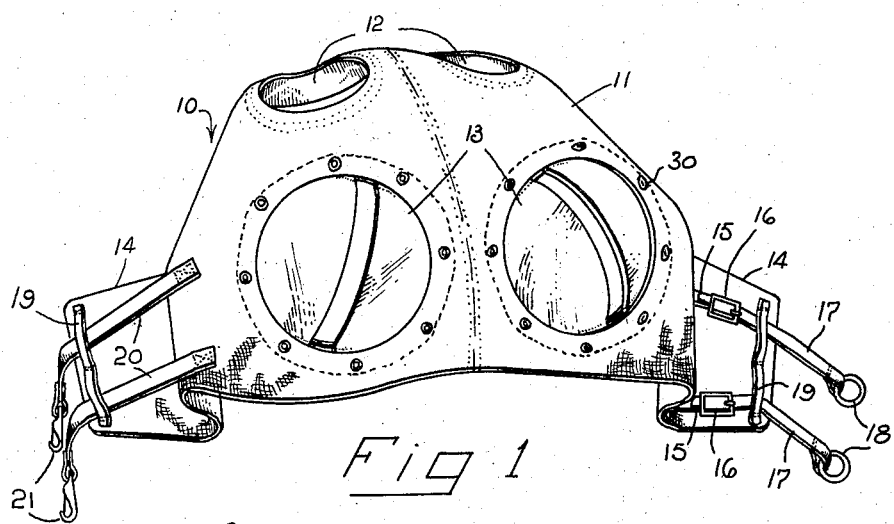
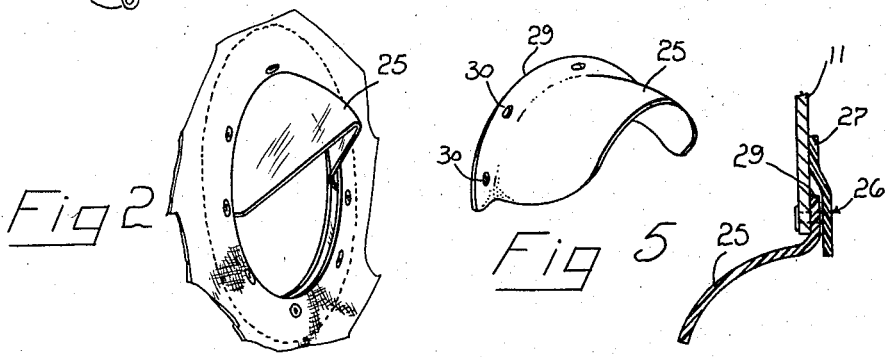
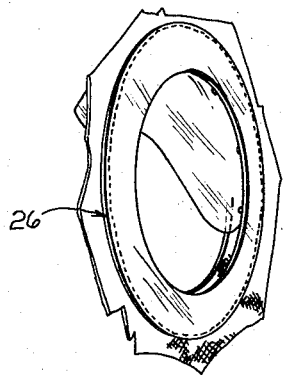
THOMAS A. DAMONE,
INVENTOR.
BY Herman Seid 2,871,642
EYE PROTECTOR Thomas A. Damone, New York, N. Y.

Application July 1, 1955, Serial No. 519,350

2 Claims. (Cl. 54—80)

This invention relates to a novel eye protecting construction, more particularly an eye protector for race horses, designed to provide protection, as desired from a variety of deleterious factors.

In the racing of horses it is found desirable to provide the horses with a variety of protective equipment, whereby the efficiency of the horse is increased and his physical well-being protected from harm. A primary need among this protective equipment is for some apparatus serving to protect the eyes of the horse from harm and distraction, and at the same time in nowise diminishing the visual acuity of the animal. Any given racehorse, will during the racing season, be raced under a variety of different track conditions. Thus, in fair weather it is desirable to provide some means for shading the eyes of the horse from the sun's rays; in rainy weather, when the track becomes muddy, protection must be provided against rain, and mud being kicked up by the hooves of the other racers. It is further desirable to provide some means for deflecting wind from the eyes of the animal as well as means for providing the conventional blinder function to avoid distraction of the animal by laterally positioned objects. Any auxiliary equipment should of course be light in weight so as not to interfere with the racing abilities of the horse.

It is with the above problems in mind that the present construction has been evolved, a construction providing a novel means for protecting the eyes of racehorses during a race and in nowise interfering with the racing abilities of the animal. This construction is readily adjustable to provide desired protection as needed under varying track conditions.

It is accordingly a primary object of this invention to provide a novel eye protector for racehorses.

A further object of this invention is to provide protective means for the eyes of racehorses which may be varied to protect against any of the undesirable extraneous elements affecting the vision of said animal.

Another object of this invention is to provide a novel eye protector for racehorses which does not interfere with the racing abilities of said horses.

It is also an object of this invention to provide protective equipment guarding the eyes of a racehorse against the sun's rays.

A still further object of this invention is to provide an eye protecting construction designed to protect the eyes of a racehorse against diversion by laterally positioned objects.

A further object of this invention is to provide an eye protector designed for use by horses when racing in rain on muddy tracks to prevent mud or rain from flying into the eyes of said horses, and to deflect the wind.

It is also an object of this invention to provide a simple, inexpensive, readily maintained, light weight eye protecting construction for racehorses which may readily be adjusted to provide protection as desired.

These and other objects of the invention which will become apparent from the following disclosures and claims are achieved by provision of a hood element of porous flexible material such as textile fabric, shaped to fit over the head of a horse, embracing the eyes and ears of the animal. Apertures are provided whereby the ears of the animal may protrude through said hood, serving to aid in retention of said hood in position. Eye openings about the eyes of the animal are also provided in said hood. These openings are preferably circular in shape and are provided with a relatively rigid peripheral ring of sheet material such as plastic or the like. Eye protectors having any of the standard desired configurations such as the full cup, the semi-cup, the French or run-out shape or the like are provided with flanges for insertion between the aforesaid peripheral ring and the portion of the hood extending thereover. To further insure securement of said eye protecting cups in the eye openings of said hood a plurality of spaced detachable fasteners such as snaps, or the like may be provided.

The specific constructional features of the novel eye protecting construction, and their mode of functioning will be made most manifest and particularly pointed out in conjunction with the accompanying drawings, wherein:

Figure 1 is a front perspective view of the hood showing a preferred arrangement of an eye protecting shield positioned in conjunction therewith.

Figure 2 is a fragmentary perspective view looking from the front of said hood indicating the relationships between the protective eye shield and the eye opening in said hood.

Figure 3 is a fragmentary detail view looking from the rear of the structural components illustrated in Figure 2.

Figure 4 is a cross sectional view taken through the eye opening of the hood and illustrating the novel mode of adjustable securement of the eye protecting shields in said eye opening.

Figure 5 is a perspective view of a semi-cup eye protecting shield shown provided with the flanges for securement in conjunction with the hood.

Figure 6 is a perspective view of the French or run-out eye protecting shield illustrating the securing means provided thereon for maintaining said shield in position on the hood.

Referring now more particularly to the drawings, like numerals in the various figures will be taken to designate like parts.

As most clearly seen in Figure 1, the novel eye protecting equipment 10, here provided comprises a hood 11, made up of a porous sheet material such as textile fabric, or the like. The hood is shaped so as to fit over the upper portion of a horse's head extending over the eyes and ears of the animal. Apertures 12, are provided at the upper portion of said hood to permit the ears of the animal to protrude therethrough. Eye openings 13, in the front face of said hood are placed so as to surround the eyes of the animal when said hood is applied. These eye openings 13, are preferably circular in shape, but may be made of any other configuration, either elliptical, rectangular or of any other desired shape. In the preferred embodiment the hood is arranged to be positioned over the head of a horse extending from the poll of the animal embracing that portion of the head between the poll extending down to a point slightly beneath the eyes covering the cheeks and provided with flaps 14, which overlap beneath the lower jaw. A preferred mode of securement employs straps 15, secured at a space distance from the end of one of said flaps 14, and coupled by means of a buckle 16, to a strap link 17, having a ring 18, at its free extremity. The strap link 17, passes beneath retaining strip 19, secured to flap 14. Straps 20, are provided on the other of said flaps 14, with clips 21, at their end for engagement with rings 18.

Eye protecting shields 25, of any desired configuration, either of the full cup type illustrated in Figures 1-4, or the semi-cup type illustrated in Figure 5, or the French type illustrated in Figure 6, or of any other desired shape may be employed in conjunction with the hood 11, above described. Conjoining of the eye protecting shield 25, and the hood 11, is achieved by provision of a peripheral retaining ring 26, of a relatively rigid material such as vinyl plastic or the like. This retaining ring 26, is dished whereby a flange thereof 27, is formed and the central dished portion 28, will be spaced from the part of the hood 11, surrounding eye openings 13. The flange portion 27, is then secured to the hood about eye opening 13.

The eye protecting shields 25, are provided with a flange 29, of a configuration corresponding to a segment of said retaining ring 26. Detachable fastening means 30, of any conventional type such as snaps may be provided on said flanges and on the portion of hood 11, above the dished part of retaining ring 26, for providing additional securement of said eye protecting piece in the eye openings 13, of said hood 11.

*Operation*

In use the novel eye protecting construction here provided is positioned over the head of the horse to protect the eyes of the animal from any of a variety of deleterious effects such as sun, wind, mud, rain, general distraction, or the like, by first positioning the hood 11, over the head of the animal with the ears of the animal protruding through apertures 12. Flaps 14, are then drawn down beneath the lower jaw of the horse and secured by means of clips 21, engaging rings 18, and tightened by means of buckles 16. It is apparent that once strap links 17, are adjusted by means of buckle 16, for any given animal, further adjustment is not required and positioning or removal of the hood 11 merely requires manipulation of snaps 21.

Once the hood is in position an appropriate eye protecting shield 25, of any desired shape, depending on the preference of the trainer is secured in position in conjunction with the hood by forcing the flange 29, of shield 25, between retaining ring 26, and the portion of hood 11, extending thereabove, as most clearly illustrated in Figure 4. It has been empirically determined that the frictional engagement between the flange 29, and retaining ring 26, is sufficient to maintain the eye protecting shield in any set position. Further securement as previously noted may be attained by employing conventional fastening means such as snaps 30, or the like.

The conventional blinder function to eliminate lateral visual distraction is attained by positioning of the eye protecting shield at the lateral extremeties of the eye opening 13. A sun shading function is attained by positioning of the eye shield at an orientation to shade the eyes of the animal from the sun's rays, normally at the uppermost portion of eye opening 13. Where the horse is raced under wet track condition, protection from mud kicked up by the hoofs of other animals is obtained by positioning of the shield to extend about the lower portion of the eye opener. Certain situations make it advisable to employ a plurality of shields 25, in each eye opening 13, of hood 11, thus the arrangement illustrated in Figure 4, suggests one preferred shield orientation which though permitting the animal to see directly in front of him protects his eyes from any of the aforementioned undesirable elements.

It is thus seen that a novel eye protecting construction has been provided of a simple, inexpensive, readily maintained nature, in which a single protector construction may readily be varied to accommodate the varying needs arising under different track conditions.

The above disclosure has been given by way of illustration and elucidation and not by way of limitation and it is desired to protect all embodiments of the herein disclosed inventive concept within the scope of the appended claims.

What is claimed is:

1. An eye protector for protecting the eyes of race horses, said protector comprising: a hood element adapted for positioning over the head of an animal, said hood having eye openings provided therein to expose the eyes of the horse to which the hood is applied; a rigid annular retaining ring positioned about the periphery of each of said eye openings; fastening means securing said retaining ring to the hood with a pocket formed between the hood portion surrounding the eye opening and the ring; fastening means provided at spaced distances on the hood portion about the entire periphery of said eye opening; and eye protecting shields having mating fastening elements spaced about an edge thereof at a distance spaced to cooperate with the aforementioned fastening means whereby the protecting shields may be removably and selectively positioned at various positions to protect the eyes of the race horse under different track conditions.

2. An eye protector as in claim 1 in which said rigid annular retaining ring has a dished inner-portion, and a flat radially outer rim fastened to said hood at its outer rim with the dished portion coextensive with the portion of the hood surrounding said eye openings to form a pocket between the dished portion and the hood within which an edge of the eye protecting shield may be received.

References Cited in the file of this patent

UNITED STATES PATENTS

| 996,931 | Krouse | July 4, 1911 |
| 1,084,109 | Plotkin | Jan. 13, 1914 |
| 1,386,989 | Capper | Aug. 9, 1921 |
| 1,583,794 | Parsons | May 11, 1926 |
| 2,158,693 | Dym | May 16, 1939 |

FOREIGN PATENTS

| 3,562 | France | Oct. 15, 1904 |
| (Addition to No. 334,982) | | |
| 26,231 | Great Britain | of 1912 |
| 729,587 | Germany | Dec. 18, 1942 |